(12) United States Patent
Fiebelkorn et al.

(10) Patent No.: US 7,175,506 B2
(45) Date of Patent: Feb. 13, 2007

(54) TOOL UNIT FOR ULTRASONICALLY ASSISTED ROTARY MACHINING

(75) Inventors: Frank Fiebelkorn, Thun (CH); Paul Stadler, Burgdorf (CH); Thomas Fankhauser, Bern (CH)

(73) Assignee: Fritz Studer AG (CH)

( * ) Notice: Subject to any disclaimer, the term of this patent is extended or adjusted under 35 U.S.C. 154(b) by 0 days.

(21) Appl. No.: 11/298,043

(22) Filed: Dec. 9, 2005

(65) Prior Publication Data
US 2006/0128283 A1    Jun. 15, 2006

(30) Foreign Application Priority Data
Dec. 13, 2004   (EP)   ................... 04405770

(51) Int. Cl.
B24B 55/02    (2006.01)
(52) U.S. Cl. .............. 451/11; 451/119; 451/155; 451/165
(58) Field of Classification Search ................ 451/119, 451/155, 156, 160, 450, 488, 11, 165
See application file for complete search history.

(56) References Cited

U.S. PATENT DOCUMENTS

| | | | | |
|---|---|---|---|---|
| 4,616,447 A | * | 10/1986 | Haas et al. .................. 451/24 |
| 4,751,916 A | * | 6/1988 | Bory ............................. 601/2 |
| 4,828,052 A | * | 5/1989 | Duran et al. .................. 175/55 |
| 5,140,773 A | | 8/1992 | Miwa et al. ................... 51/59 |
| 5,144,771 A | | 9/1992 | Miwa ............................ 51/59 |
| 5,361,543 A | | 11/1994 | Bory ........................... 451/165 |
| 6,204,592 B1 | * | 3/2001 | Hur ....................... 310/323.18 |

FOREIGN PATENT DOCUMENTS

| | | |
|---|---|---|
| DE | 36 06 304 A1 | 9/1986 |
| EP | 0 646 435 A1 | 4/1995 |
| JP | 59118306 | 7/1984 |

OTHER PUBLICATIONS

German Search Report 04405770.1 dated Jun. 14, 2005.

* cited by examiner

*Primary Examiner*—Lee D. Wilson
*Assistant Examiner*—Anthony Ojini
(74) *Attorney, Agent, or Firm*—Ostrolenk, Faber, Gerb & Soffen, LLP

(57) ABSTRACT

The tool unit for the ultrasonically assisted rotary machining of a workpiece comprises a converter (23) including at least one electroacoustic transducer (22) for generating and transmitting ultrasonic oscillations, a tool (30) that is coupled to the converter, and a holder (21) in which the converter including the transducer is arranged and which is insertable at least partially in the retainer (11) of a tool spindle (10) and connectable thereto by means of a detachable connection (27).

19 Claims, 4 Drawing Sheets

TOOL UNIT FOR ULTRASONICALLY ASSISTED ROTARY MACHINING

FIELD OF THE INVENTION

The present invention refers to a tool unit for the ultrasonically assisted rotary machining of a workpiece and to an assembly comprising such a tool unit and a tool spindle.

BACKGROUND OF THE INVENTION

In the rotary machining of hard-brittle or difficult machinable materials such as ceramics, glass or hard metals, the cutting tool may be exposed to loads that are so high that it is subject to premature wear. In order to extend the tool life, it is known practice to superimpose ultrasonic oscillating movements to the rotational tool movement, thereby transmitting ultrasonic oscillations to the tool or the workpiece, respectively. This results in a modification of the machining cinematics while the ultrasonic oscillations have an advantageous influence upon material removal.

Tool assemblies that are suitable for such a combined machining are known from the references DE-A1-41 03 569 (corresponding to U.S. Pat. No. 5,144,771) and EP-A1-591 104 (corresponding to U.S. Pat. No. 5,361,543). These known assemblies suffer from the disadvantage that they cannot be held in current tool spindles so that the machine tool must be specially designed for using such a tool assembly. It is therefore impossible or difficult to also use other tools, e.g. tools that are exclusively intended for rotary machining operations, in the same machine tool. In particular, the known tool assemblies are unsuitable for retrofitting an existing machine, e.g. a circular grinding machine, in a simple manner so that ultrasonically assisted machining operations are also possible. Furthermore, the tool assemblies of the prior art are relatively bulky and therefore unsuitable for being used at high rotational speeds of the tool spindle.

SUMMARY OF THE INVENTION

It is an object of the present invention to provide a tool unit of the kind mentioned in the introduction that can be held in a tool spindle, is easily exchangeable and whose design is as compact as possible. This is accomplished with the tool unit of the invention.

The invention concerns a tool unit and in one application an assembly comprising such a tool unit. The tool unit comprises a converter for generating and transmitting ultrasonic oscillations including at least one electroacoustic transducer, a tool that is coupled to the converter, and a holder in which the converter including the transducer is arranged. The holder is insertable at least partially in the retainer of a tool spindle and connectable thereto by means of a detachable connection.

BRIEF DESCRIPTION OF THE DRAWINGS

The invention will be explained hereinafter by means of a preferred exemplary embodiment and with reference to figures, where.

DETAILED DESCRIPTION OF THE PREFERRED EMBODIMENTS

Figure 1:
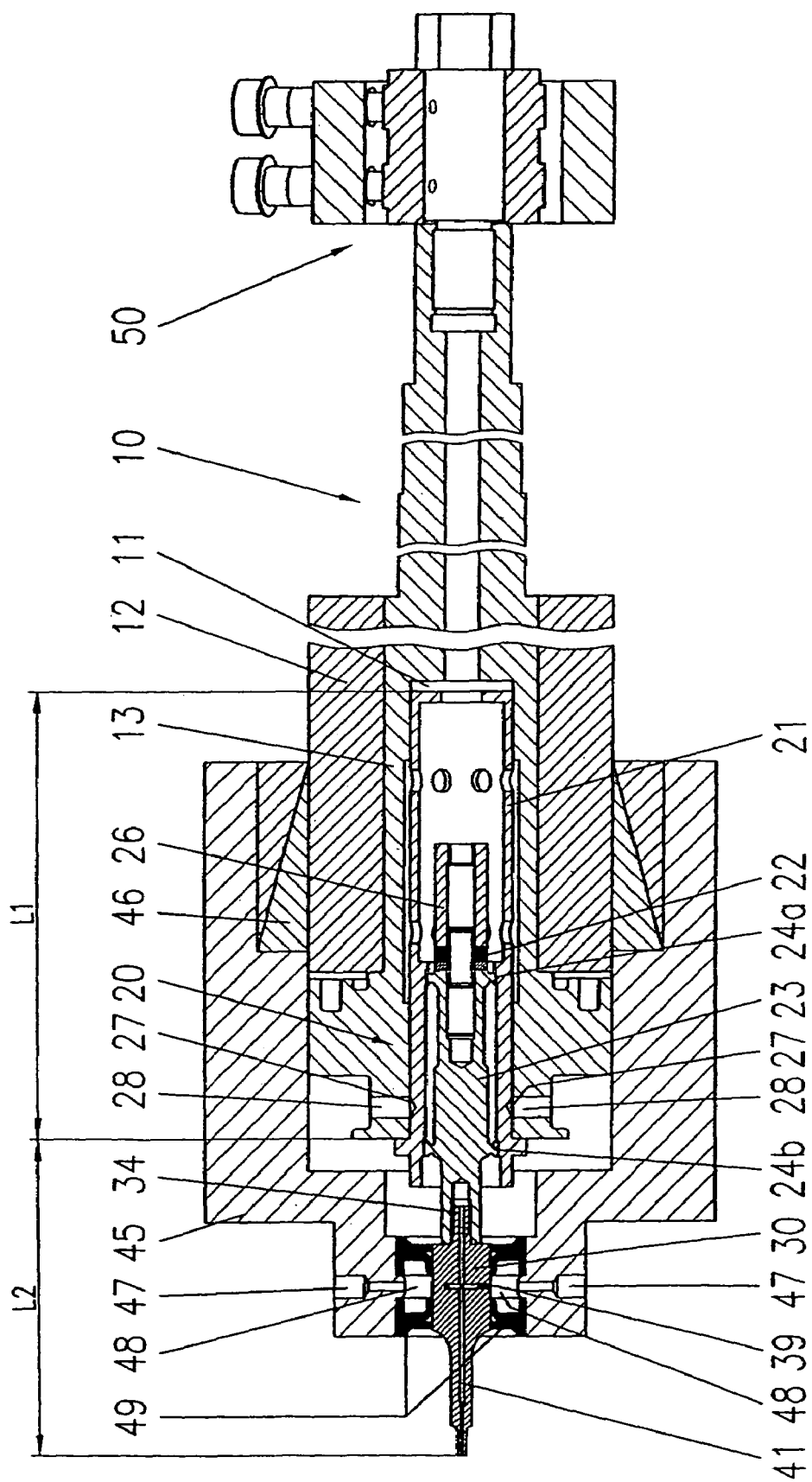
FIG. 1 shows a sectioned lateral view of the tool unit of the invention while being held in a tool spindle.

FIG. 1 shows tool unit 20 that is inserted in the retainer 11 of tool spindle 10 and that is designed as an exchangeable tool module. Tool unit 20 comprises a holder 21 in which a converter 23 comprising at least one electroacoustic transducer 22 for generating and transmitting ultrasonic oscillations is arranged, and a tool 30 that is coupled to converter 23.

In the example of FIG. 1, holder 21 is in the form of a sleeve and is inserted at least partially in retainer 11 of tool spindle 10. Converter 23 is retained in holder 21 at two supporting locations 24a and 24b, whose positions correspond to respective nodes of the generated ultrasonic oscillations. Supporting locations 24a and 24b are formed by respective annular shoulders. Depending on the intended application, more than two supporting locations may be provided.

Transducer 22, which converts the electric oscillations into mechanical ones, is for instance of the piezoelectric or magnetostrictive type. To this end, a disk or a plurality of disks of a piezoceramic or magnetostrictive material are arranged in the interior of the projecting end portion 26 of converter 23. Transducer 22 is chosen such that it is preferably operable both in the low and in the high frequency ranges, more particularly above 50 kHz. Generally, the application of transducers 22 having higher frequencies allows a more compact design of tool unit 20.

In order to form a detachable connection with tool spindle 10, holder 21 comprises at least one connecting means 27 that is adapted to the interface used on the tool spindle. In the example according to FIG. 1, holder 21 comprises at least one clamping location 27 and the head of tool spindle 10 at least one cross hole 28. A screw (not shown) acting upon clamping location 27 can be passed through said hole for securing tool unit 20 in retainer 11. Such a clamping screw connection may also comprise a plurality of clamping locations 27 and corresponding cross holes 28.

Figure 6:
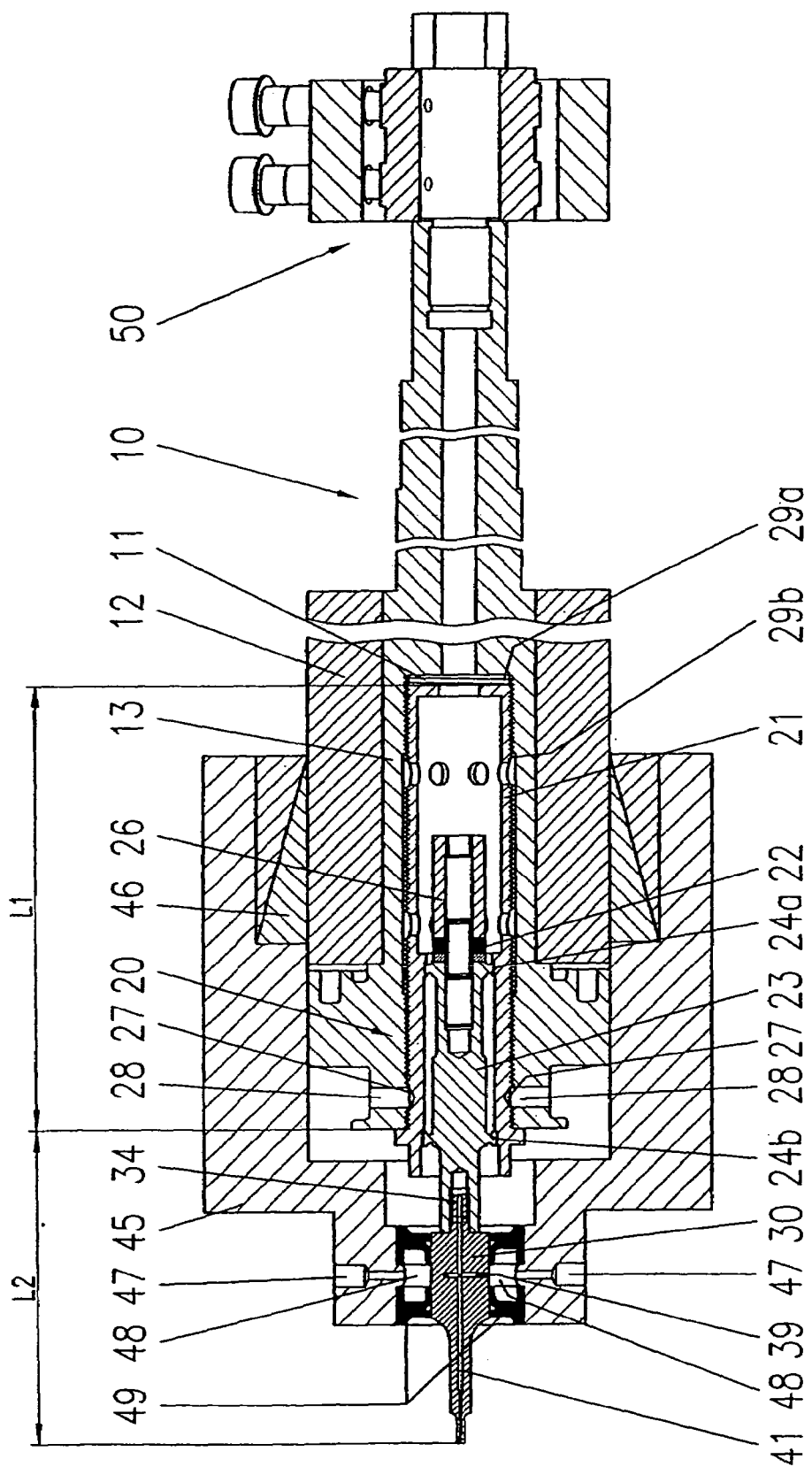
FIG. 6 shows a sectioned lateral view of a third embodiment of the tool unit according to the invention.

If a hollow shank taper is used as an interface, holder 21 is provided with a corresponding conical external surface to form the connecting means. If an interface is used where a tool is held by means of a detachable cemented and/or shrink-fit connection, connecting means 27 is designed correspondingly for receiving and holding tool unit 20 in the tool spindle. Another suitable interface is a threaded connection where retainer 11 of tool spindle 10 is provided with an internal thread 29a and holder 21 with a corresponding external thread 29b as shown in FIG. 6

Tool 30 is coupled to the front end of converter 23, thereby allowing the tool to be vibrated, in which case is it also called a sonotrode. Tool 30 is made of titanium, aluminum or hardened steel such as CPM.

Figure 2:
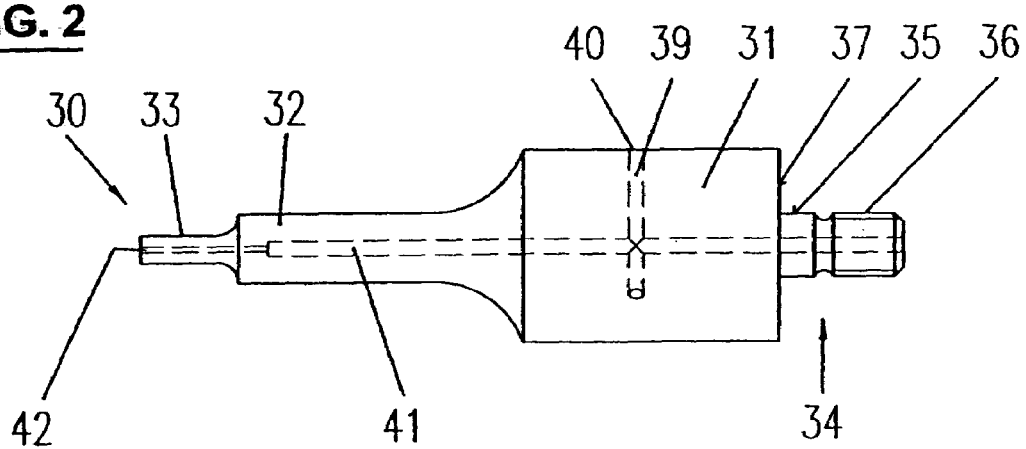
FIG. 2 shows a lateral view of the tool of the tool unit according to FIG. 1.

As appears in FIG. 2 as well, tool 30 comprises a first cylindrical tool portion 31 that is followed by a second tool portion 32 of smaller diameter. Tool body 33, which is brought into contact with the workpiece that is to be machined, is located at the tip of tool 30. The shape of tool 30 may be chosen such that it provides an amplification of the amplitude and that the ultrasonic oscillations generated by transducer 22 are amplified to the desired extent. In typical applications, the amplitude of the tool tip oscillation is comprised in a range from 0 to about 20 micrometers. Sonotrode 30 may also have another shape than that shown in FIG. 2, such as a conical or merely cylindrical one. It is also conceivable to interpose a so-called booster between converter 23 and sonotrode 30 for a further amplification of the amplitude.

The end face of first tool portion 31 is provided with a connecting member 34 having an axial centering surface 35 and a following threaded portion 36 that engages in the bore of converter 23. As shown in FIG. 2, centering surface 35 is cylindrical; however, it may be differently designed, e.g. conically. The end face of first tool portion 31 is designed as a radial centering surface 37. Centering surfaces 35 and 37 ensure that tool 30 is centered in the axial and radial directions when coupled to converter 23 and thus rotatable without eccentricity.

Tool body 33 is designed according to the intended machining operation. For grinding operations, it is in the form of a grinding body that may optionally be provided with a diamond or CBN coating. Second tool portion 32 may be made in one piece with grinding body 33 and directly coated with the abrasive coating. It is also possible that grinding body 33 is provided as a separate member that is received in second tool portion 32 by a detachable connection, e.g. by screwing, shrinking, clamping, soldering and/or cementing.

As shown in FIG. 2 in particular, tool 30 is provided with a radial bore 39 having an inlet opening 40 and communicating with an axial bore 41 having an outlet opening 42 at the tool tip. Bores 39 and 41 form a channel through which a coolant in the form of a liquid can be led. This allows ejecting a coolant through tool 30 and outlet opening 42 for cooling and/or lubrication, thereby extending the lifetime of tool 30 as well as the quality of the machined surfaces of the workpiece.

Figure 3:
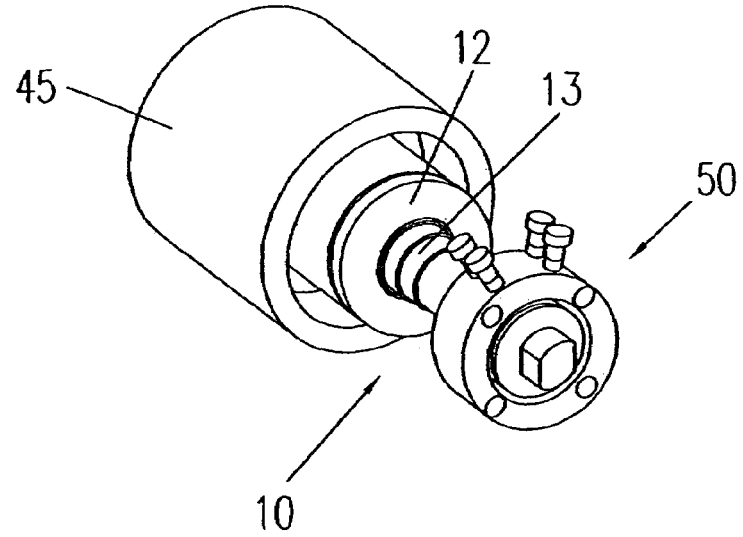
FIG. 3 shows a perspective rear view of the assembly of the tool unit and the tool spindle of FIG. 1.
Figure 4:
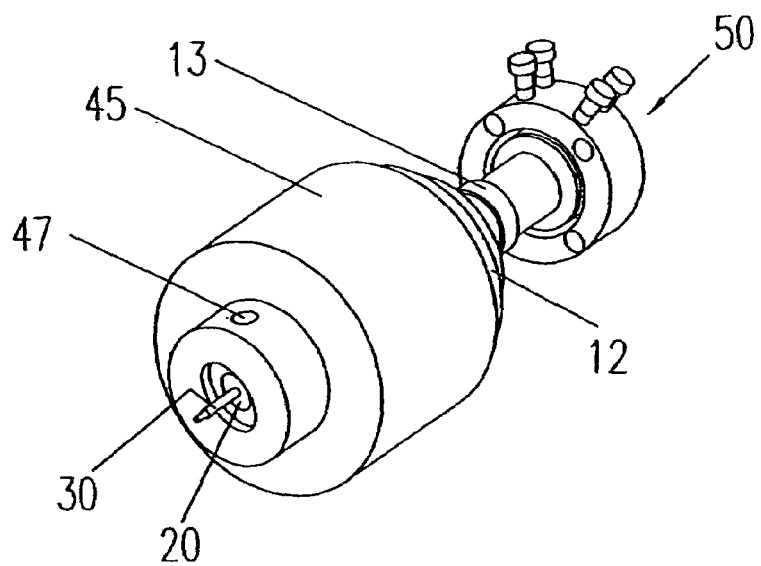
FIG. 4 shows a perspective front view of the assembly of FIG. 1.

As shown in FIGS. 3 and 4 also, tool spindle 10 comprises a stationary portion 12 in which shaft 13 with spindle retainer 11 is rotatable and on the outside of which a bell 45 is secured by means of a clamping sleeve 46 or by screw. clamping. Bell 45 encloses the forward portion of shaft 13 and is provided with coolant fittings 47 and bores 48 through which the coolant can be supplied to inlet opening 40. Between stationary bores 48 and rotatable tool 30, sealing means 49 e.g. in the form of a labyrinth seal are provided.

If tool unit 20 is exclusively intended for dry machining, tool 30 may of course be designed without openings 40, 42 and channels 39, 41.

Tool unit 20 has a compact construction having an overall length of L=L1+L2, where L1 designates the length of the portion that is located in spindle retainer 11 and L2 the length of the portion that projects from tool spindle 10 and is therefore free-standing. Typically, tool unit 20 is designed such that L2 is smaller than 100 mm and preferably smaller than 50 mm and L1 is smaller than 150 mm and preferably smaller than 100 mm. The compact construction allows using tool unit 30 even at high rotational speeds, more particularly rotational speeds over 60,000 revolutions per minute. In order to achieve these rotational speeds, tool spindle 10 is correspondingly designed, e.g. as a high frequency spindle or as a spindle with coupled drive motors.

If transducer 22 is of the piezoelectric type, slip rings 50 that are connectable to a generator are provided. Slip rings 50 are coupled to shaft 13 of tool spindle 10 and through which the power is supplied to transducer 22. The materials for slip rings 50 are selected so as to be suitable for the. rotational speeds to be achieved by tool spindle 10.

Figure 5:
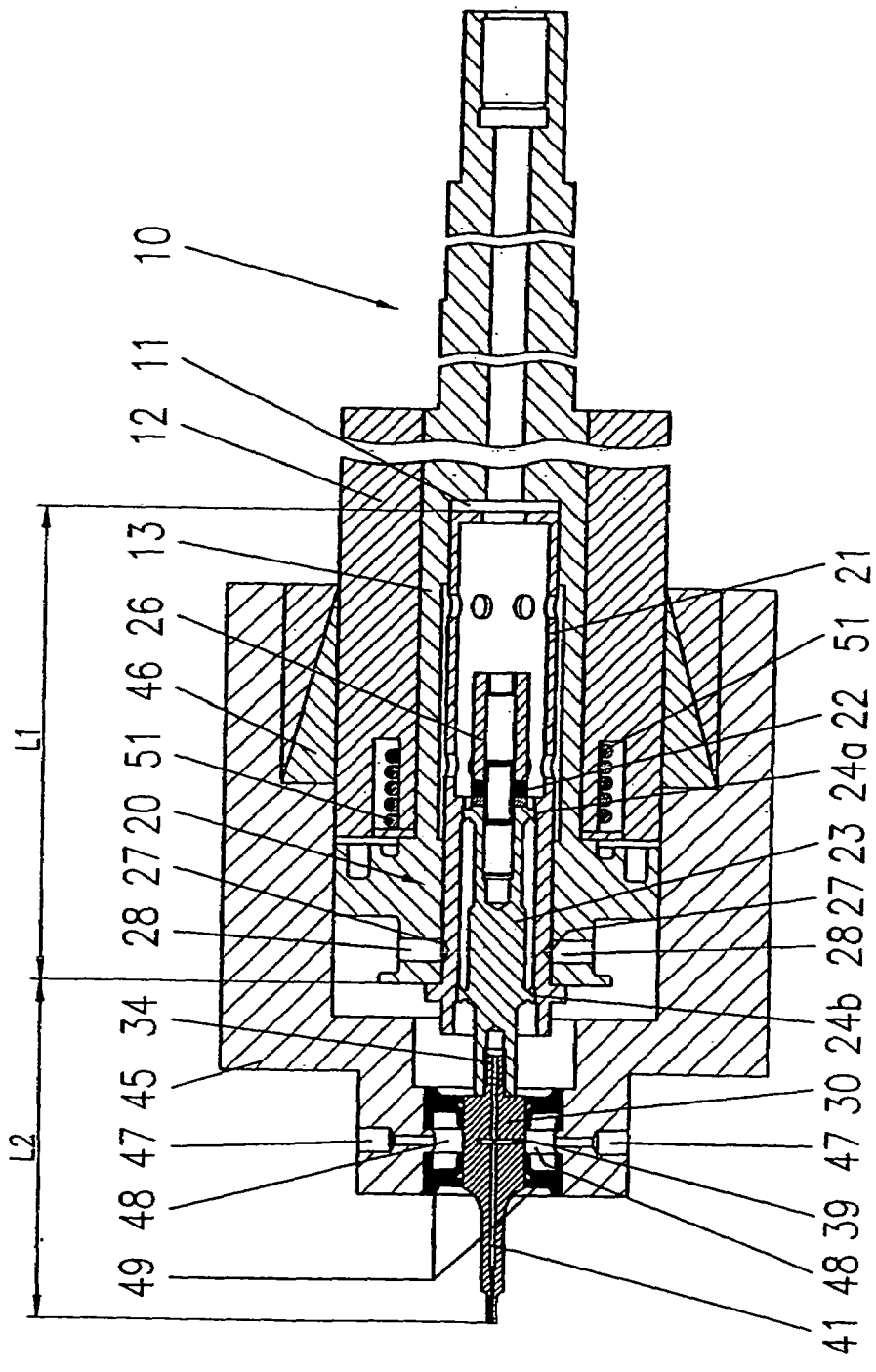
FIG. 5 shows a sectioned lateral view of a second embodiment of the tool unit according to the invention.

If transducer 22 is of the magnetostrictive type, at least one excitation coil 51 is provided as shown in FIG. 5, wherein members that are the same as in FIG. 1 are indicated with the same reference numbers. The excitation coil 51 is accommodated in the stationary part 12 of tool spindle 10 and serves for supplying transducer 22 contactlessly with energy by magnetic induction. It is also conceivable to accommodate excitation coil 51 in bell 45.

The tool unit 30 described here is e.g. applicable in machine tools for fine machining such as grinding machines, particularly circular grinding machines, or milling machines. Depending on the configuration of tool 33, tool unit 30 may also be used for ultrasonically assisted machining in other machining operations such as drilling, turning, reaming, honing, deburring, etc. Amongst others, tool unit 30 is suitable for machining hard-brittle or difficult machinable materials—e.g. ceramics, materials made of CBN (cubic boron nitride), materials made of PCD (polycrystalline diamond), cermets, hard metals, etc.—and/or for machining conventional materials, e.g. steel materials, nonferrous metals, sintered materials, synthetic materials, etc.

Other than previously described, the tool unit of the invention offers the following advantages:

The tool unit is designed as an exchangeable unit and can be used on the same machine spindle as other tools. Also, existing machine tools that have previously been used only for rotary machining can be retrofitted for additional ultrasonically assisted machining.

The tool unit has a compact design. It can be designed such that even machining operations at rotational speeds of over 60,000 revolutions per minute are possible and that oscillations having frequencies of over 50 kHz may be superimposed to both axial and radial machining of the workpiece.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tool unit for the ultrasonically assisted rotary machining of a workpiece, comprising:
    a converter for generating and transmitting ultrasonic oscillations, said converter comprising at least one electroacoustic transducer;
    a tool that is coupled to said converter; and
    a holder in which said converter with said transducer is arranged, said holder being insertable at least partially in the retainer of a tool spindle and connectable thereto by means of a detachable connection, said tool unit adapted to permit rotation of speeds of over 60,000 revolutions per minute.

2. The tool unit according to claim 1, further comprising at least one clamping location or a thread or both for forming said detachable connection.

3. The tool unit according to claim 1, further comprising a conical external surface or a cylindrical external surface or both for forming said detachable connection.

4. The tool unit according to claim 1, wherein said length of said tool unit projecting from said tool spindle is smaller than 50 mm.

5. The tool unit according to claim 1, wherein said tool comprises at least one lateral inlet opening and at least one outlet at the head of said tool, said two openings being connected by a channel.

6. The tool unit according to claim 1, wherein said tool is in the form of a sonotrode made of titanium, steel, or aluminum.

7. The tool unit according to claim 1, wherein said tool is a grinding or milling tool.

8. The tool unit according to claim 1, wherein said tool comprises a tool body which is fastened by a detachable connection and which serves for machining a workpiece.

9. The unit according to claim 1, wherein said transducer is a piezoelectric or magnetostrictive transducer.

10. The tool unit according to claim 1, wherein said transducer is operable at a frequency of at least 50 kHz.

11. The tool unit according to claim 1, wherein said holder comprises annular shoulders for forming said supporting locations.

12. The tool unit according to claim 1, wherein said holder is designed as a sleeve.

13. The tool unit according to claim 1, further comprising a bell for supplying said tool with a coolant.

14. An assembly comprising a tool unit according to claim 1 and a tool spindle provided with a predetermined interface for holding said tool unit and at least one other tool.

15. The assembly according to claim 14, further comprising slip rings that are connectable to a generator for the power supply of said transducer.

16. The assembly according to claim 14, further comprising at least one excitation coil for the power supply of said transducer.

17. An assembly comprising a tool unit for ultrasonically assisted rotary machining of a workpiece and a tool spindle provided with a predetermined interface for holding said tool unit and at least one other tool, said tool unit comprising a converter for generating and transmitting ultrasonic oscillations, said converter comprising at least one electroacoustic transducer;

a tool that is coupled to said converter; and a holder in which said converter with said transducer is arranged, said holder being insertable at least partially in the retainer of a tool spindle and connectable thereto by means of a detachable connection wherein said assembly is designed for rotational speeds of said tool spindle of over 60,000 revolutions per minute.

18. A tool unit for the ultrasonically assisted rotary machining of a workpiece, comprising:

a converter for generating and transmitting ultrasonic oscillations, said converter comprising at least one electroacoustic transducer;

a tool that is coupled to said converter; and a holder in which said converter with said transducer is retained at at least two supporting locations which define nodes of the generated ultrasonic oscillations, said holder being insertable at least partially in the retainer of a tool spindle and connectable thereto by means of a detachable connection.

19. A tool unit for the ultrasonically assisted rotary machining of a workpiece, comprising:

a converter for generating and transmitting ultrasonic oscillations, said converter comprising at least one electroacoustic transducer;

a tool that is coupled to said converter; and a holder in which said converter with said transducer is arranged and which is insertable at least partially in the retainer of a tool spindle so that it projects from said tool spindle by a length that is smaller than 100 mm, said holder being connectable to said tool spindle by means of a detachable connection.

* * * * *

UNITED STATES PATENT AND TRADEMARK OFFICE
CERTIFICATE OF CORRECTION

PATENT NO. : 7,175,506 B2  Page 1 of 1
APPLICATION NO. : 11/298043
DATED : February 13, 2007
INVENTOR(S) : Frank Fiebelkorn et al.

It is certified that error appears in the above-identified patent and that said Letters Patent is hereby corrected as shown below:

In claim 11 (column 5, line 18), delete "said".

Signed and Sealed this

Eighth Day of May, 2007

JON W. DUDAS
*Director of the United States Patent and Trademark Office*